(12) United States Patent
Feng et al.

(10) Patent No.: US 8,887,119 B2
(45) Date of Patent: Nov. 11, 2014

(54) METHOD AND APPARATUS FOR CURRENT LIMIT TEST FOR HIGH POWER SWITCHING REGULATOR

(71) Applicant: Analog Devices Technology, Hamilton (BM)

(72) Inventors: Roger Feng, Shanghai (CN); Junxiao Chen, Shanghai (CN); Bin Shao, Shanghai (CN)

(73) Assignee: Analog Devices Technology, Hamilton (BM)

( * ) Notice: Subject to any disclaimer, the term of this patent is extended or adjusted under 35 U.S.C. 154(b) by 0 days.

(21) Appl. No.: 14/028,792

(22) Filed: Sep. 17, 2013

(65) Prior Publication Data

US 2014/0282349 A1    Sep. 18, 2014

Related U.S. Application Data

(60) Provisional application No. 61/778,087, filed on Mar. 12, 2013.

(51) Int. Cl.
*G06F 17/50* (2006.01)

(52) U.S. Cl.
CPC .................................. *G06F 17/5081* (2013.01)
USPC .......................................... 716/136; 716/132

(58) Field of Classification Search
CPC ................ G06F 17/50–17/5081; G11C 5/147;
G11C 29/00–29/886; G11C 2929/00–2929/5606
See application file for complete search history.

(56) References Cited

U.S. PATENT DOCUMENTS

| | | | |
|---|---|---|---|
| 4,782,290 A | 11/1988 | Sakai et al. | |
| 7,262,625 B2 | 8/2007 | Vorenkamp et al. | |
| 7,439,636 B2 * | 10/2008 | Lewis | 307/117 |
| 8,278,960 B2 | 10/2012 | McQuirk et al. | |
| 2007/0296391 A1 * | 12/2007 | Bertin et al. | 323/303 |
| 2009/0167272 A1 * | 7/2009 | Furuichi et al. | 323/284 |
| 2009/0261861 A1 * | 10/2009 | Shimada | 327/52 |
| 2011/0006794 A1 | 1/2011 | Sellathamby et al. | |
| 2011/0285374 A1 * | 11/2011 | Balakrishnan et al. | 323/284 |
| 2011/0316491 A1 * | 12/2011 | Saint-Pierre | 323/205 |
| 2013/0049137 A1 * | 2/2013 | Uno et al. | 257/401 |

* cited by examiner

*Primary Examiner* — Leigh Garbowski
(74) *Attorney, Agent, or Firm* — Patent Capital Group (57) ABSTRACT

A method can reuse at least one pin in demultiplexing (demuxing) a voltage from a pin. The method can be used to set an accurate current limit threshold in a design for test (DFT) phase and, thus, to accurately set a trimming code of a current limiter. The method uses the property that a power MOSFET has almost a same conductive resistance at a large drain current. Thus, the current limit threshold can be set according to an accurate drain-to-source voltage $V_{ds}$ at a small current sink that is less than a maximum current that ATE is able to provide. An accurate voltage $V_{ds}$ can be measured through Kelvin sensing drain and source pins of the power MOSFET, which are connected to a current sense circuit.

20 Claims, 9 Drawing Sheets

FIG. 1

CONVENTIONAL ART

FIG. 2

CONVENTIONAL ART

METHOD AND APPARATUS FOR CURRENT LIMIT TEST FOR HIGH POWER SWITCHING REGULATOR

PRIORITY DATA

This application is a non-provisional of U.S. Provisional Patent Application Ser. No. 61/778,087, filed Mar. 12, 2013, which is hereby incorporated by reference in its entirety.

BACKGROUND

This disclosure relates in general to the field of automatic test equipment (ATE) for DC-DC converters and, more particularly, to a current limit test implemented by such ATE for a high power switching regulator.

ATE tests a device (e.g., an integrated circuit (IC)) by automatically taking measurements and evaluating the results thereof. In some cases, the ATE performs tests using IC pins in a design for test (DFT) structure.

One example of an IC that can be tested with ATE is a high-power DC-DC converter. In some implementations, the high power DC-DC converter includes two transistors as switches: a high-side transistor and a low-side transistor. To address efficiency concerns, a power n-channel metal-oxide-semiconductor (MOS) field-effect transistor (FET) can be used as the high-side switching transistor. Current limit protection can be implemented by sensing a peak current of the high-side power MOSFET.

Variation inherent in the manufacturing processes of semiconductor devices introduces non-idealities into those devices. Similarly, such variation can lead to a mismatch between the elements of a device. Accordingly, to address these non-idealities, some characteristics, such as a current limit threshold, need to be trimmed on a chip-by-chip basis.

Figure 1:
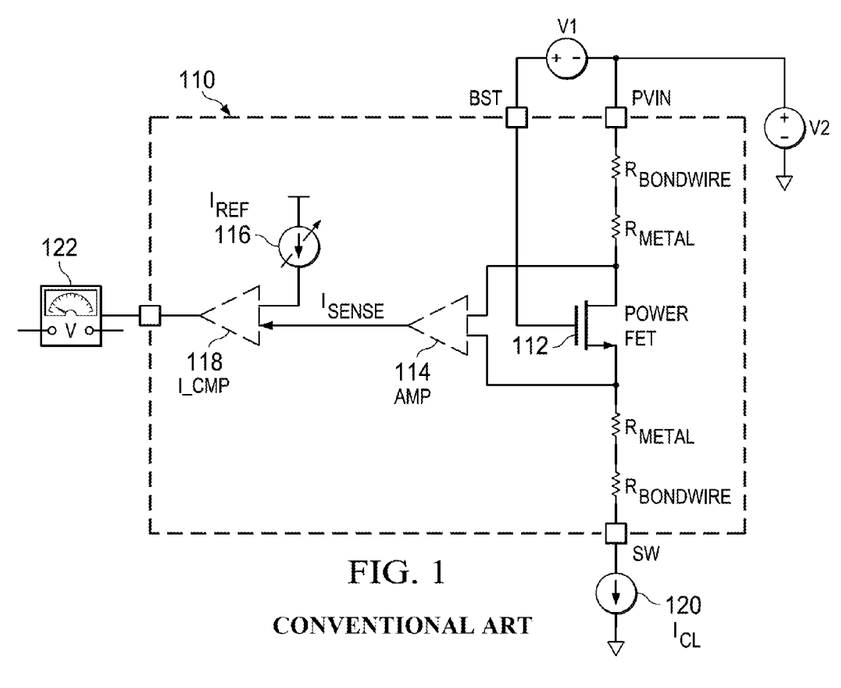
FIG. 1 illustrates a conventional current limit process implemented by ATE on a DFT structure.

FIG. 1 generally shows a conventional current limit process implemented by ATE on a DFT structure. The IC 110 illustrated in FIG. 1 includes a high-side (HS) power NMOS transistor 112 and a low-side (LS) MOS transistor (not pictured). The LS MOS is, for example, an N-type transistor having a drain connected to a source of the HS power NMOS 112. The IC 110 also includes a current sense amplifier 114, a variable current source 116, and a current limit comparator 118.

The current sense amplifier 114 samples a voltage difference between a drain and a source of the HS power NMOS transistor 112. The current sense amplifier 114 outputs a voltage signal (not pictured) or a current signal (e.g., $I_{sense}$) proportional to the drain current of the HS power NMOS transistor 112. The current limit comparator 118 can receive the sensed current signal $I_{sense}$ and compare that signal with a reference current $I_{ref}$ provided by the variable current source 116. The current limit comparator 118 transits from, e.g., a low signal to a high signal, when the sensed current signal $I_{sense}$ becomes larger than the reference current $I_{ref}$.

In the current limit process illustrated in FIG. 1, the ATE provides a current source 120, a voltage meter 122, and voltage sources V1 and V2. The current source 120 sources a target current $I_{CL}$ at a pin connected to a source of the HS power NMOS transistor 112 (e.g., at a SW pin of the IC). Then, the ATE sends trim codes to the IC 110 to instruct the variable current source 116 to sweep the reference current $I_{ref}$. The voltage meter 122 measures when the voltage output by the current limit comparator 118 transits. Thus, the ATE is able to determine the trim code that causes the output of the current limit comparator 118 to transit.

In a large output current application, the current $I_{CL}$ can be desired to be much larger than the current capacity of the ATE. For example, the current $I_{CL}$ can be desired to reach 15 amperes, although some ATE can only provide a maximum current source of 2 amperes. In such a scenario, if $I_{CL}$ is greater than 2 amperes, the ATE cannot source the desired current $I_{CL}$. Hence, another method is needed to emulate this process.

Some products use a sense SW pin or a sense PVIN pin to test a resistance between a drain and a source of a transistor when the transistor is on. However, those products need an extra PVIN pin or an extra SW pin. Such extra pins are not necessarily available in an actual application.

Figure 2:
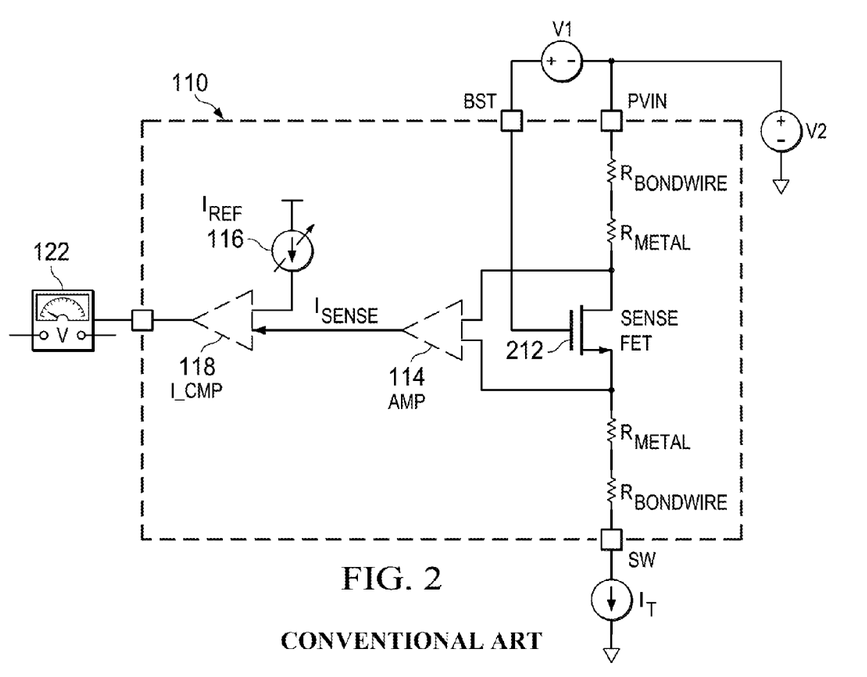
FIG. 2 illustrates a conventional test structure that uses a sense FET method.

Another conventional method uses a test structure as shown in FIG. 2. In this method, a small sense FET 212 is used to emulate the resistance of the HS power NMOS transistor 112, rather than using the HS power NMOS transistor 112 itself. Then, the ATE can directly source a current $I_T$ from a pin connected to a source of the small sense FET 212 (e.g., from the SW pin) to determine an optimal trimming code. However, this method introduces an error due to a mismatch between the HS power NMOS transistor 112 and the small sense FET 212. In addition, this method needs a more complex layout and extra area for the small sense FET 212 and its driver circuit.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

A method can reuse at least one pin in demultiplexing (demuxing) a voltage from a pin. The method can be used to set an accurate current limit threshold in a design for test (DFT) phase and, thus, to accurately set a trimming code of a current limiter. The method uses the property that a power MOSFET has almost a same conductive resistance at a large drain current. Thus, the current limit threshold can be set according to an accurate drain-to-source voltage $V_{ds}$ at a small current sink that is less than a maximum current that ATE is able to provide. An accurate voltage $V_{ds}$ can be measured through Kelvin sensing drain and source pins of the power MOSFET, which are connected to a current sense circuit.

A method is provided in one example and includes demultiplexing a drain of a power metal-oxide-semiconductor field-effect transistor (MOSFET) from a first pin of an integrated circuit (IC) to a second pin of the IC; demultiplexing a source of the power MOSFET from a third external pin of the IC to a fourth external pin of the IC; determining a voltage difference between the second pin and the fourth pin; testing a resistance between the drain and the source of the power MOSFET, based at least in part on the voltage difference; and setting a current limit threshold for the power MOSFET, based at least in part on the resistance.

An apparatus is provided in one example and includes equipment configured to demultiplex a drain of a power metal-oxide-semiconductor field-effect transistor (MOSFET) from a first pin of an integrated circuit (IC) to a second pin of the IC and to demultiplex a source of the power MOSFET from a third external pin of the IC to a fourth external pin of the IC; and a processing unit configured to determine a voltage difference between the second pin and the fourth pin. The equipment is further configured to test a resistance between the drain and the source of the power MOSFET, based at least in part on the voltage difference. The processing unit is further configured to set a current limit threshold for the power MOSFET, based at least in part on the resistance.

In another example, logic is encoded in at least one tangible medium that includes code for execution and, when executed by a processor, is operable to perform operations. The operations include demultiplexing a drain of a power metal-oxide-semiconductor field-effect transistor (MOSFET) from a first pin of an integrated circuit (IC) to a second pin of the IC; demultiplexing a source of the power MOSFET from a third external pin of the IC to a fourth external pin of the IC; determining a voltage difference between the second pin and the fourth pin; testing a resistance between the drain and the source of the power MOSFET, based at least in part on the voltage difference; and setting a current limit threshold for the power MOSFET, based at least in part on the resistance.

Example Embodiments

One step-down DC-DC (e.g., buck) converter IC includes pins defined for undervoltage lockout (UVLO), power-good output (open drain) (PGOOD), output of internal voltage regulator (VREG), synchronization input (SYNC), switch node output (SW), power input (PVIN), supply rail for high-side gate drive (bootstrap) (BST), feedback voltage sense input (FB), and PLL Ground (PGND).

In addition, such an IC includes a high-side (HS) FET and a low-side (LS) FET. In one embodiment in which the HS FET is an NFET, a source thereof is connected to the SW pin and a drain thereof is connected to the PVIN pin. Similarly, a drain of the LS FET is connected to the SW pin, and a source of the LS FET is connected to the PGND pin. Thus, from one view, the HS FET is on the high side of the SW pin, and the LS FET is on the low side of the SW pin.

Such an IC can be tested with ATE. As discussed previously, ATE automatically takes measurements and evaluates the results thereof. In order to take such measurements, the ATE can provide voltage and/or current sources, voltage and/or current meters, and send commands to and receive outputs from an IC. Of course, the ATE can provide additional services as well, and it is not required that ATE perform all of the foregoing operations. Further, the ATE can be programmed to perform these operations sequentially or in parallel.

Figure 3:
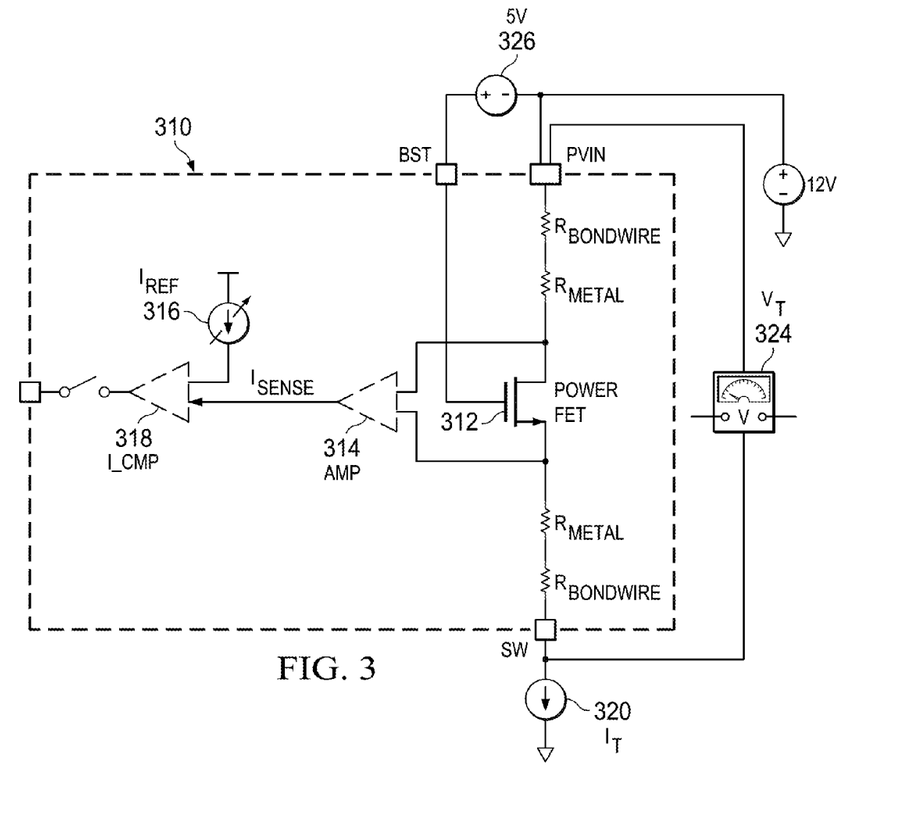
FIG. 3 illustrates a current limit trim implemented by ATE in which a pin-to-pin resistance is tested.

FIG. 3 illustrates a current limit trim implemented by ATE in which a pin-to-pin resistance of an IC 310 is tested. In the current limit trim illustrated in FIG. 3, the ATE provides a current source 320, a voltage meter 324, a voltage source 326, and a 12V source. The voltage source 326 applies a voltage at a pin (e.g., a BST pin) connected to a gate of the HS power NMOS transistor 312. The 12V source is applied between ground and a pin connected to a drain of the HS power NMOS transistor 312.

First, the ATE attempts to determine a resistance across a drain and a source of the HS power NMOS transistor 312. As actually implemented, the ATE instead tests a resistance $R_{pin-pin}$ between two pins of the IC 310 connected to a drain and a source of the HS power NMOS transistor 312. The ATE tests this resistance $R_{pin-pin}$ by first adding the current source 320 at a pin (e.g., a SW pin) connected to a source of the HS power NMOS transistor 312. The ATE uses the current source 320 to sink a current $I_T$. Then, the ATE uses the voltage meter 324 to attempt to measure a voltage difference across the HS power NMOS transistor 312. In an actual implementation, the voltage meter 324 measures a voltage difference $V_T$ between pins (e.g., between a PVIN pin and a SW pin) connected to a source and a drain of the HS power NMOS transistor 312. Then, the ATE can derive the resistance $R_{pin-pin}$ from Ohm's Law by dividing the measured voltage difference $V_T$ by the sunk current $I_T$.

Figure 4:
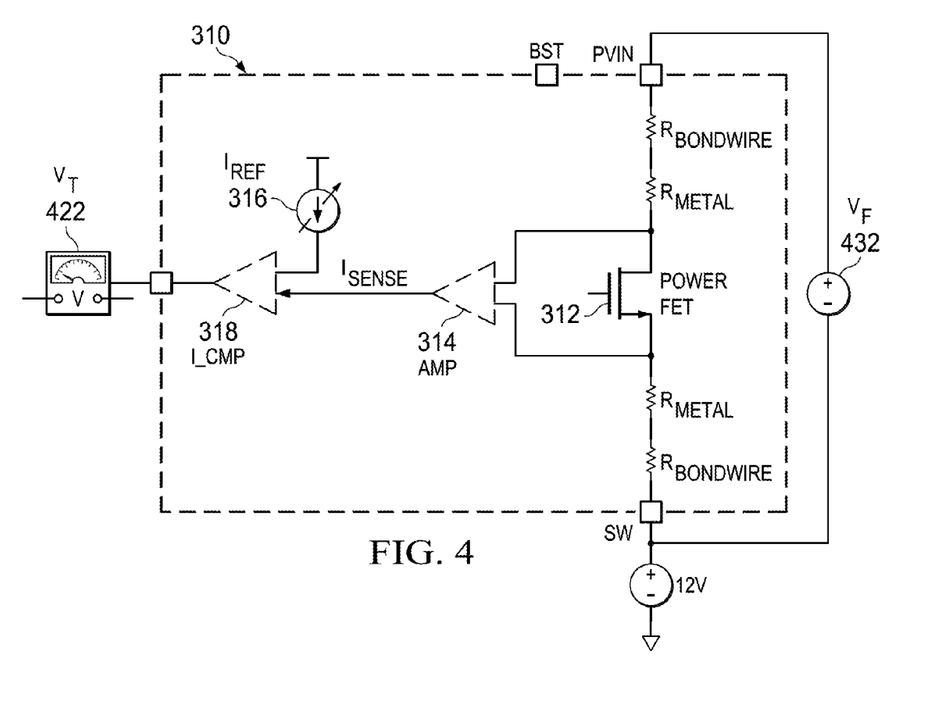
FIG. 4 illustrates a current limit trim implemented by ATE in which a pin-to-pin resistance is tested.

Subsequently, the ATE reconfigures itself as shown in FIG. 4. In particular, the ATE removes the current source 320, the voltage meter 324, and the voltage source 326. In addition, the ATE adds a voltage meter 422 and a voltage source 432. The ATE also places the 12V source between ground and the SW pin on one hand and the voltage source 432 on the other.

The voltage source 432 provides a voltage $V_F$ between pins connected to a source and a drain of the HS power NMOS transistor 312 (e.g., between the SW pin and the PVIN pin). Here, the added voltage $V_F$ is equal to a current $I_{CL}$ multiplied by the resistance $R_{pin-pin}$. The current $I_{CL}$ is a current specification of the IC. The ATE forces the HS power NMOS transistor 312 off by removing the voltage source 326 from a pin (e.g., the BST pin) connected to a gate of the HS power NMOS transistor 312. The current sense amplifier 314, the variable current source 316, and current limit comparator 318 function similarly to analogous structures set forth in FIG. 1. The voltage meter 422 measures when the voltage output by the current limit comparator 318 transits. The ATE thus is able to determine a trim code that makes the current limit comparator 318 transit.

This method introduces an error due to a metal resistance $R_{metal}$ and a bonding wire resistance $R_{bondwire}$ between a pin to which the voltage source 432 connects (e.g., a PVIN pin) and a drain of the HS power NMOS transistor 312. An analogous error is introduced between another pin to which the voltage source 432 connects (e.g., a SW pin) and a source of the HS power NMOS transistor 312.

Figure 5:
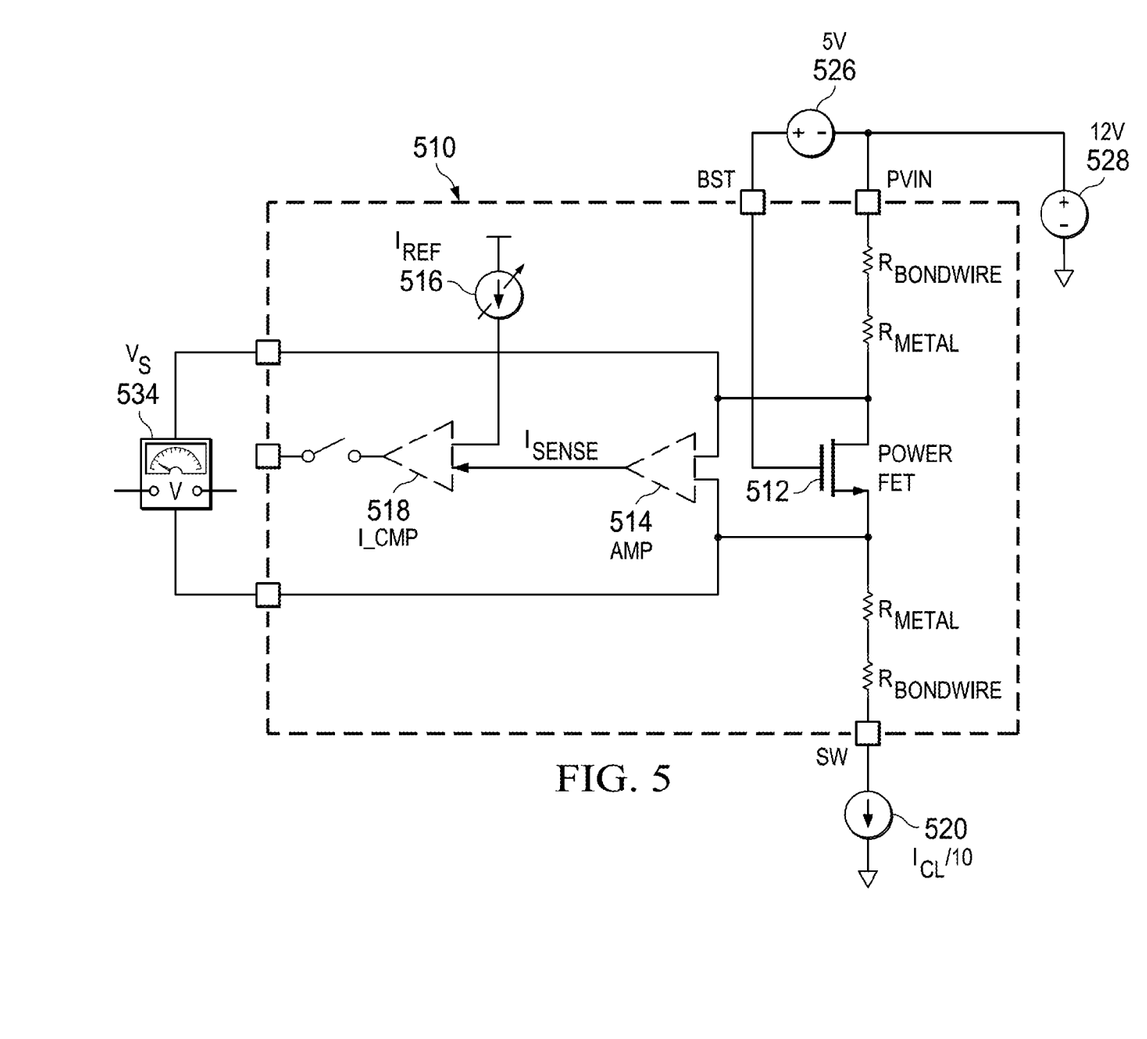
FIG. 5 illustrates a first structure for a current limit trimming process in accordance with one embodiment.

FIG. 5 illustrates a first structure for a current limit trimming process. As shown in FIG. 5, the IC 510 includes a power FET 512, a current sense amplifier 514, a variable current source 516, and a current limit comparator 518. Resistances $R_{bondwire}$ and $R_{metal}$ are seen from terminals of the power FET 512 to a connected pin. Specifically, in an embodiment in which the power FET 512 is an NMOS transistor, those resistances are seen from a drain of the power FET 512 to, e.g., a PVIN pin. Similarly, those resistances are seen from a source of the power FET 512 to, e.g., a SW pin.

The ATE connects a drain of the power FET 512 to a pin (e.g., a UVLO pin) and connects a source of the power FET 512 to another pin (e.g., a PGOOD pin). The ATE adds a voltage meter 534 between those two pins. The ATE also adds a current source 520 at a pin connected to a source of the power FET 512 (e.g., the SW pin) to sink a current $I_{CL}$. Further, the ATE connects a voltage source 526 between a pin connected to a drain of the power FET 512 (e.g., the PVIN pin) and a pin connected to a gate of the power FET 512 (e.g., a BST pin). In addition, the ATE connects a voltage source (e.g., a 12V supply) 528 between ground and a pin connected to a drain of the power FET 512 (e.g., the PVIN pin).

Figure 6:
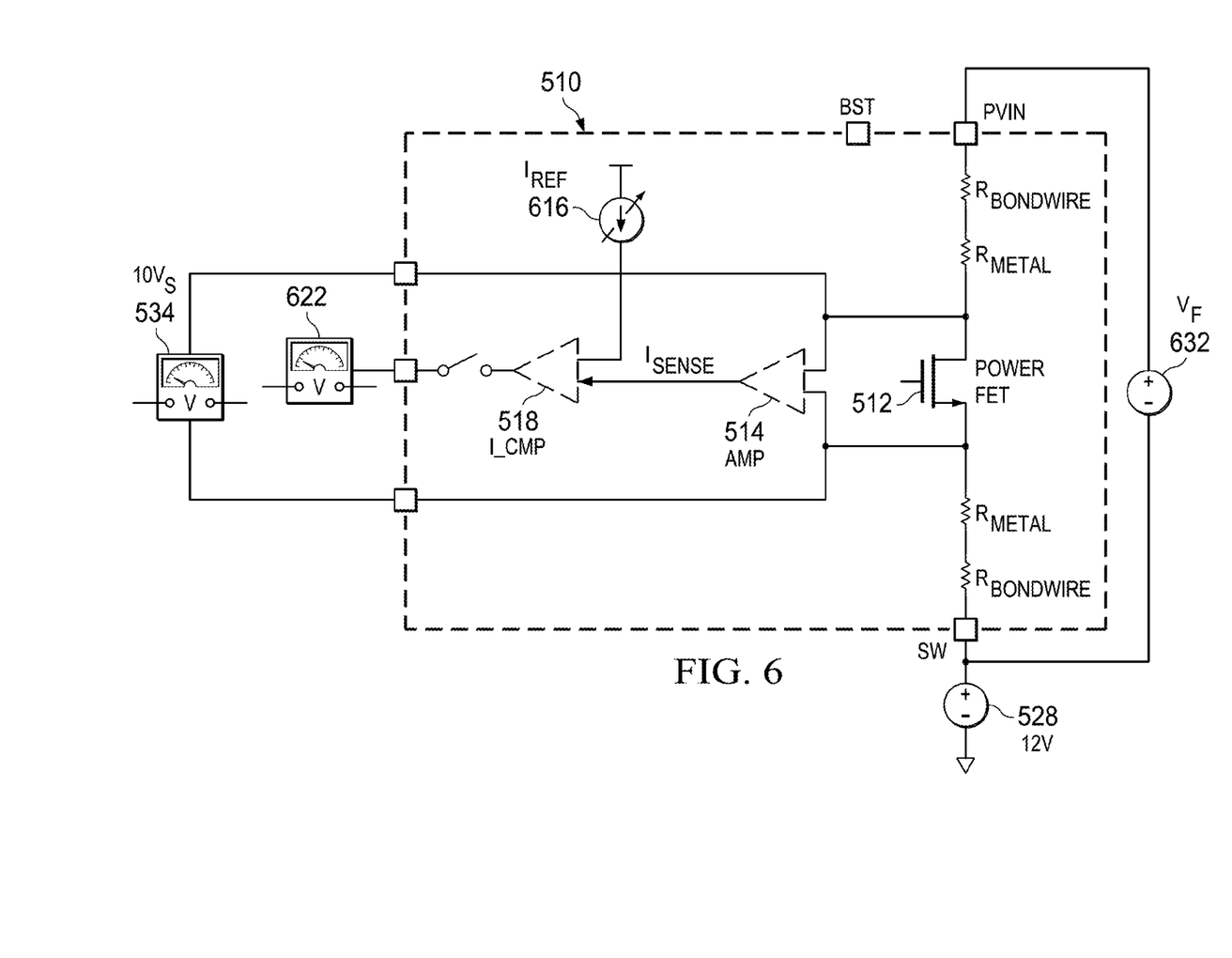
FIG. 6 illustrates a second structure for a current limit trimming process in accordance with one embodiment.

FIG. 6 illustrates a second structure for the current limit trimming process. As shown in FIG. 6, the ATE removes the current source 520 and the voltage source 526. Further, the ATE modifies the voltage source 528 to connect between ground and a pin connected to a source of the power FET 512 (e.g., the SW pin). In addition, the ATE adds a voltage source 632 between that pin (e.g., the SW pin) and a pin connected to the drain of the power FET 512 (e.g., the PVIN pin). The ATE additionally adds a voltage meter 622 to a pin connected to an output of the current limit comparator 518.

Figure 7:
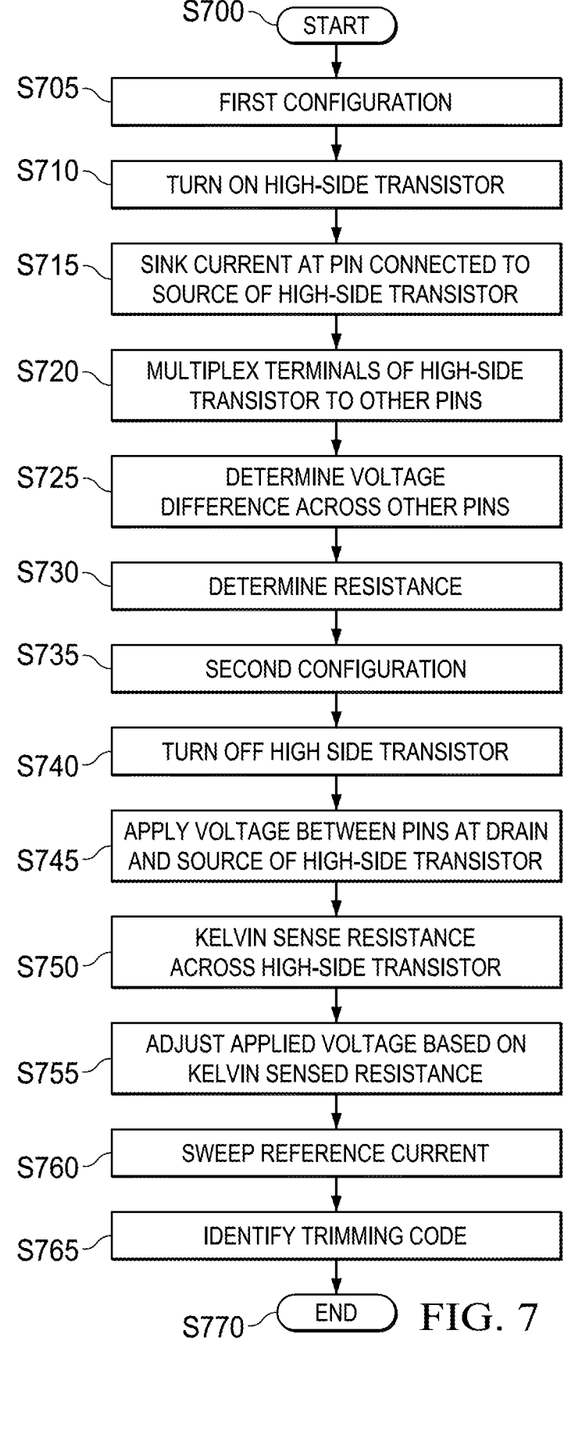
FIG. 7 illustrates a current limit trimming process in accordance with one embodiment.

FIG. 7 illustrates an exemplary current limit trimming process. As shown generally in FIG. 7, the method begins at S700 and proceeds to S705. At S705, the ATE configures itself in a first structure, e.g., the structure shown in FIG. 5. At S710, the ATE turns on the high-side (HS) FET 512 of the DC-DC converter, e.g., by setting an appropriate DFT code. At S715, the ATE instructs the current source 520 to sink a current I related to an over-current protection (OCP) or current limit (CL) current (i.e., $I_{OCP}$ or, equivalently, $I_{CL}$) at a pin connected to a source of the HS FET 512 (e.g., at the SW pin).

$I_{CL}$ is a current specification of the IC 510. As discussed above, the current $I_{OCP}$ (or, equivalently, $I_{CP}$) can be much larger than the current capacity of the ATE. For example, in a high power embodiment, $I_{CL}$ is several tens of amperes. In a specific implementation, $I_{LC}$ is 17 amperes. To meet the current capacity of the ATE, the current source 520 sinks a current I at S715 equal to a fraction of the current $I_{OCP}$. In one embodiment, this current is a small current approximately equal to $I_{CL}/10$. In one such embodiment, $I_{CL}/10=1.7$ amperes, which is less than the maximum 2 amperes the ATE can provide.

At S720, the ATE demultiplexes (demuxes) a drain of the HS FET 512 from a first external pin to a second external pin. In addition, the ATE demuxes a source of the HS FET 512 from a third external pin to a fourth external pin. In one embodiment, the first external pin is the PVIN pin, the second external pin is a UVLO pin, the third external pin is the SW pin, and the fourth external pin is a PGOOD pin. Of course, at least the second and fourth pins are interchangeable, and other pins can be used, as well. At S725, the ATE instructs the voltage meter 534 to determine a voltage difference V between the second and fourth external pins. At S730, the ATE determines a resistance R from Ohm's Law by dividing the voltage difference V found in S725 by the current I provided at S715.

At S735, the ATE reconfigures itself in a second structure, e.g., the structure shown in FIG. 6. At S740, the ATE sets a DFT code to force the HS FET 512 off. This operation can also be accomplished by disconnecting a gate of the HS FET 512 from a power source, such as by removing the voltage source 526.

At S745, the ATE instructs the voltage source 632 to apply a voltage $V_F$ between the first external pin and the third external pin. This voltage $V_F$ is equal to the resistance R determined in S730 multiplied by the current I provided at S715. Subsequently, at S750, the ATE instructs the voltage meter 534 to measure a voltage difference between the second and fourth external pins, thereby Kelvin sensing the resistance across the HS FET 512.

At S755, the ATE instructs the voltage source 632 to adjust the voltage $V_F$ based on the Kelvin sensed resistance. Thus, the ATE ensures the actual voltage between sampling pins of the current sense amplifier 514 approximately equals the reciprocal of the fraction used in S715 multiplied by the voltage V determined at S725. For example, in an embodiment in which the current I sunk in S715 was equal to $I_{CL}/10$, the ATE ensures the actual voltage is equal to 10*V. Subsequently, at S760, the ATE transmits trimming codes to sweep a reference current $I_{REF}$ provided by the current source 616. Then, at S765, the ATE instructs the voltage meter 622 to measure an output of the current limit comparator 518. Thereby, the ATE identifies a trimming code that causes an output of the current limit comparator 518 to transit from, e.g., low to high. The operations end at S770.

Figure 8:
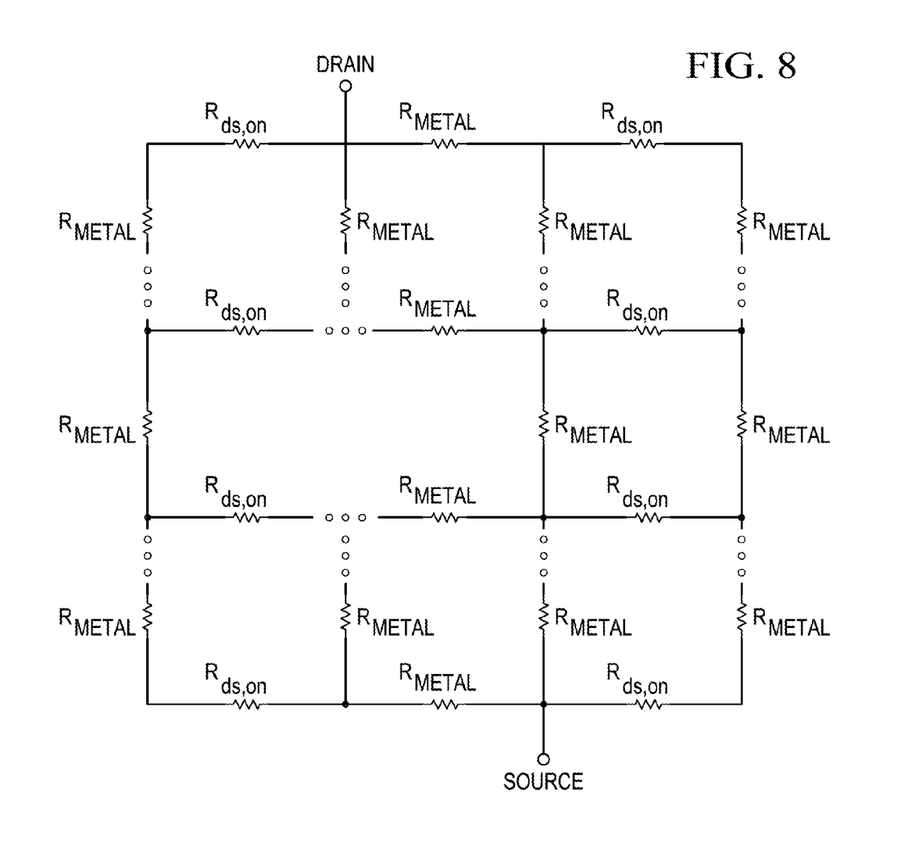
FIG. 8 illustrates an equivalent resistance of an actual power MOSFET.

In some embodiments, the resistance of the HS FET 512 is a complex resistor network that contains metal connection line resistances (e.g., $R_{metal}$) and small MOSFET conductive resistances (e.g., $R_{ds,on}$). FIG. 8 illustrates an equivalent resistance of an actual power MOSFET. A $V_{ds}$ voltage of the power MOSFET 512 in a switching regulator application is very small, for example, usually smaller than 100 mV. Thus, the resistance between the two sample pins (e.g, UVLO and PGOOD) of the current sense circuit is not affected significantly (e.g., is almost kept constant) under the different load current.

Figure 9:
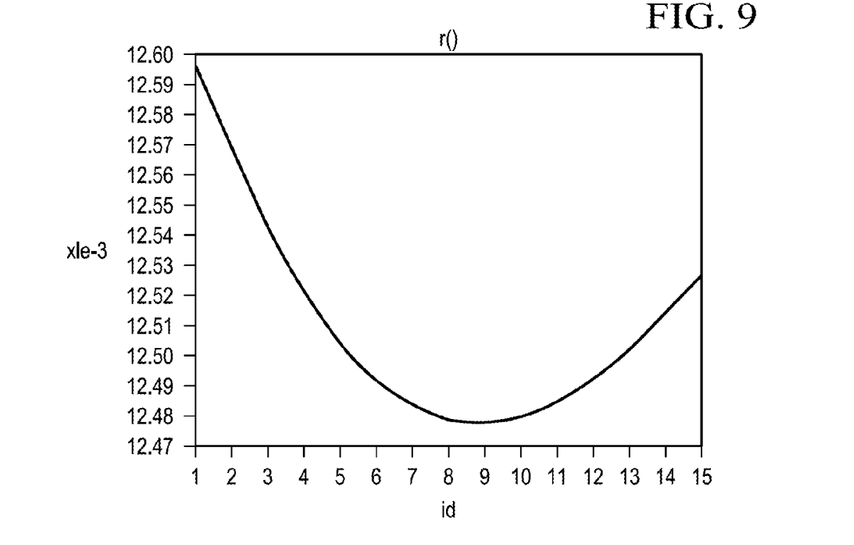
FIG. 9 illustrates an on-resistance of a power MOSFET under a load current range in accordance with one embodiment.

Indeed, FIG. 9 shows $R_{ds,on}$ of the power MOSFET 512 under a load current range from 1 A to 15 A. As shown in FIG. 9, the resistance generally keeps constant under a current ranging from 1 A to 15 A. Thus, the resistance between sample pins of the current sense amplifier 514 almost keeps constant both in the first configuration and in the second configuration.

Figure 10:
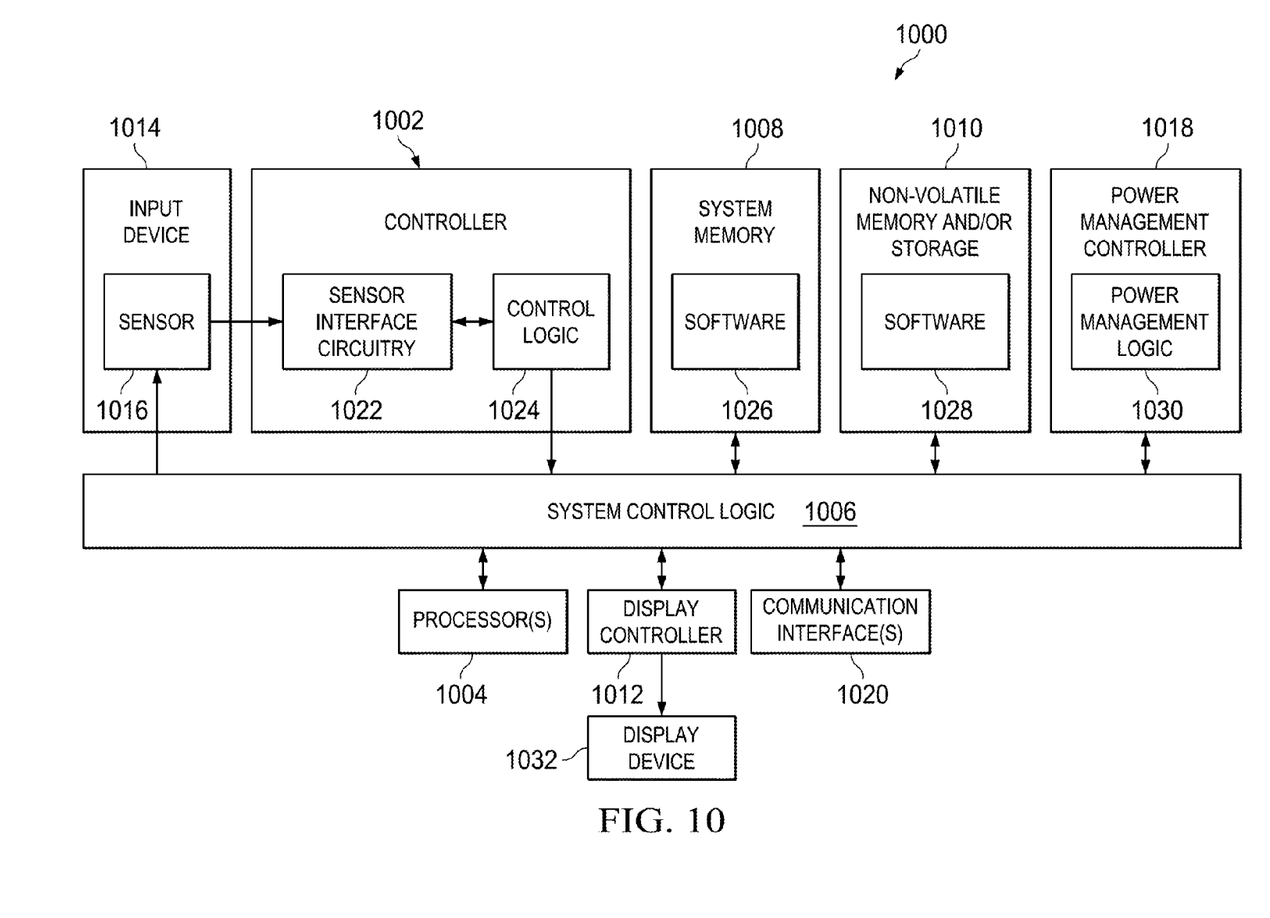
FIG. 10 is a simplified block diagram illustrating electronics associated with ATE in accordance with one embodiment.

FIG. 10 is a simplified block diagram illustrating electronics associated with ATE 1000 that can be programmed to execute an embodiment of the present disclosure. ATE 1000 includes an input device 1014, a controller 1002, one or more processors 1004, and system control logic 1006 coupled to the input device 1014, the controller 1002, and at least one of processor(s) 1004. ATE 1000 also includes system memory 1008, non-volatile memory and/or storage device(s) 1010, display controller 1012, power management controller 1018, and communication interface(s) 1020, all of which are coupled to system control logic 1006.

Input device 1014 includes sensor 1016, each of which can be implemented in various ways. For example, the input device 1014 can be a touchpad implemented using, for example and without limitation, capacitive, resistive, surface acoustic wave (SAW), infrared, and/or optical imaging technologies in sensor 1016. Input device 1014, in a particular embodiment, is implemented using suitable single- or multi-touch technology. Input device 1014 can also be a mouse, a keyboard, a pointing stick, a microphone, or a camera.

System control logic 1006, in a particular embodiment, includes controllers to provide for any suitable interface to at least one of processor(s) 1004 and/or to any suitable device or component in communication with system control logic 1006. System control logic 1006, in a particular embodiment, includes one or more memory controllers to provide an interface to system memory 1008. System memory 1008 can load and store data and/or instructions, such as software 1026. System memory 1008, in a particular embodiment, includes any suitable memory, such as dynamic random access memory (DRAM), SDRAM, or ROM, for example. System control logic 1006, in a particular embodiment, includes one or more input/output (I/O) controllers to provide an interface to a display device 1032, controller 1002, and non-volatile memory and/or storage device(s) 1010.

Non-volatile memory and/or storage device(s) 1010 store data and/or instructions, for example, such as software 1028. Non-volatile memory and/or storage device(s) 1010 can include any suitable non-volatile memory, such as flash memory, for example, and/or any suitable non-volatile storage device(s), such as one or more hard disc drives (HDDs), one or more compact disc (CD) drives, and/or one or more digital versatile disc (DVD) drives, for example.

Power management controller 1018 includes power management logic 1030 configured to control various power management and/or power saving functions of ATE 1000 based upon a configuration and/or an unused state of ATE 1000. In one embodiment, power management controller 1018 reduces the power consumption of components or devices of ATE 1000. For example, in a particular embodiment when ATE 1000 has not recently been used, power management controller 1018 performs one or more of the following: power down an unused portion of the display device 1032 and/or any backlight associated therewith; allow one or more of processor(s) 1004 to go to a lower power state if less computing power is appropriate; and shutdown any devices and/or components, such as an input device, that are unused.

Communications interface(s) 1020 can communicate over one or more networks and/or with any other suitable device. Communications interface(s) 1020 can include any suitable hardware and/or firmware, such as a network adapter, a wireless network adapter, a telephone modem, and/or a wireless modem. Communications interface(s) 1020 can also use, for example, USB, RS-232, or GPIB/IEEE-488.

System control logic 1006, in a particular embodiment, includes one or more input/output (I/O) controllers to provide an interface to any input/output device(s) such as, for example, a microphone, a speaker, a camera, a camcorder, a printer, and/or a scanner.

In one embodiment, at least one processor 1004 is packaged together with logic for one or more controllers of system control logic 1006 to form a System in Package (SiP). In one embodiment, at least one processor 1004 is integrated on the same die with logic for one or more controllers of system control logic 1006. For a particular embodiment, at least one processor 1004 is integrated on the same die with logic for one or more controllers of system control logic 1006 to form a System on Chip (SoC).

Controller 1002 can include sensor interface circuitry 1022 and control logic 1024. Sensor interface circuitry 1022 receives digital input data from input device 1014. Thus, sensor interface circuitry 1022 includes circuitry that depends, for example, on the technology used for input device 1014. For example, in one embodiment, sensor interface circuitry 1022 supports any suitable single- or multi-touch technology. The digital input data for such an embodiment can include location or coordinate data. Other types of digital data, such as an image, a sound, and an acceleration, can be used.

Control logic 1024 helps control sensor interface circuitry 1022 and can be implemented using any logic, including hardware, firmware, and/or software logic, that can depend on the circuitry used for sensor interface circuitry 1022. Control logic 1024 can output digital input data to system control logic 1006 and/or at least one processor 1004 for processing.

The software executed by at least one of processor(s) 1004 can be written in one or more programming languages. By way of example only, the software can be written in C, C++, Java, Python, Pascal, LabVIEW, Smalltalk, and ATLAS. Suitable software can include, for example, driver software and/or application software. The software can be executed by a single processor or by multiple processors. In the case of multiple processors, each processor can execute software to perform the entirety of an algorithm such as, e.g., the algorithm of FIG. 7. Alternatively, each processor can perform a portion of the algorithm, preferably in parallel.

As illustrated in FIG. 10, system memory 1008 stores suitable software 1026 and can be implemented in non-volatile memory and/or one or more storage device(s).

Modifications

In the above discussion, the HS FET 512 and the LS FET were described as NFETs. It is also possible to implement the HS FET 512 and the LS FET as PFETs.

In embodiments described above, specific current sources and voltage sources were discussed. Some or all of the current sources can be supplemented by a parallel resistance to function as a voltage source with a series resistance, and vice-versa.

In examples set forth above, the process of determining a trim code was discussed in the context of ATE. Of course, the process can be implemented by a human without the use of ATE.

The activities discussed above with reference to the FIGURES are applicable to any integrated circuits that involve signal processing, particularly those that can execute specialized software programs or algorithms, some of which may be associated with processing digitized real-time data. Certain embodiments relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, and other digital-processing-based systems.

Moreover, certain embodiments discussed above can be provisioned in digital signal processing technologies for medical imaging, patient monitoring, medical instrumentation, and home healthcare. Such technologies include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure are applied in industrial markets that include process control systems that help drive productivity, energy efficiency, and reliability. In consumer applications, the teachings of the integrated circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be part of smartphones, tablets, security systems, PCs, gaming technologies, virtual reality, simulation training, etc.

The process can be implemented by a processor executing computer instructions. These instructions can be embodied in transmission media, such as software itself or in a propagating wave or signal. Alternatively, the instructions can be embodied in a non-transitory media, such as a memory. Examples of such a memory include random access memory (RAM), read only memory (ROM), and disks. Specific examples of disks include solid-state hard drives, magnetic disks, optical disks, and magneto-optical disks.

In the discussions of the embodiments above, the transistors, switches, DFT, comparators, amplifiers, current sources, and/or voltage sources can readily be replaced, substituted, or otherwise modified to accommodate particular circuitry needs. I n addition, the use of complementary electronic devices, hardware, software, etc., offers an equally viable option for implementing the teachings of the present disclosure.

Any number of electrical circuits of the FIGURES can be implemented on a motherboard of an associated electronic device. The motherboard can be a general circuit board that holds various components of the internal electronic system of the electronic device and, further, provides connectors for other peripherals. More specifically, the motherboard can provide the electrical connections by which other components of the system can communicate electrically. Any suitable processors (inclusive of digital signal processors, microprocessors, supporting chipsets, etc.), memory elements, etc. can be coupled to the motherboard based on particular configuration needs, processing demands, computer designs, etc. Other components such as external storage, additional sensors, controllers for audio/video display, and peripheral devices can be attached to the motherboard as plug-in cards, via cables, or integrated into the motherboard itself.

In another example embodiment, the electrical circuits of the FIGURES are implemented as stand-alone modules (e.g., a device with associated components and circuitry configured to perform a specific application or function) or implemented as plug-in modules into application specific hardware of electronic devices. Particular embodiments of the present disclosure can be included in a system on chip (SOC) package, either in part or in whole. An SOC represents an IC that integrates components of a computer or other electronic system into a single chip. It can contain digital, analog, mixed-signal, and often radio frequency functions, all of which can be provided on a single chip substrate. Other embodiments include a multi-chip-module (MCM), with a plurality of separate ICs located within a single electronic package and configured to interact with each other through the electronic package. In various other embodiments, the functionalities are implemented in one or more silicon cores in Application Specific Integrated Circuits (ASICs), Field Programmable Gate Arrays (FPGAs), and other semiconductor chips.

All of the specifications, dimensions, and relationships outlined herein (e.g., the number of processors and memory elements, logic operations, etc.) have only been offered for purposes of example and teaching only. Such information can be varied considerably without departing from the spirit of the present disclosure or the scope of the appended claims. The specifications apply only to non-limiting examples and, accordingly, they should be construed as such. In the foregoing description, example embodiments have been described with reference to particular processor and/or component arrangements. Various modifications and changes can be made to such embodiments without departing from the scope of the appended claims. The description and drawings are, accordingly, to be regarded in an illustrative rather than in a restrictive sense.

With the numerous examples provided herein, interactions were described in terms of two, three, four, or more electrical components. However, this has been done for purposes of clarity and example only. It should be appreciated the system can be consolidated in any manner. Along similar design alternatives, any of the illustrated components, modules, and elements of the FIGURES can be combined in various possible configurations, all of which are clearly within the broad scope of this disclosure. In certain cases, it may be easier to describe one or more of the functionalities of a given set of flows by only referencing a limited number of electrical elements. The electrical circuits of the FIGURES and its teachings are readily scalable and can accommodate a large number of components, as well as more complicated/sophisticated arrangements and configurations. Accordingly, the examples provided should not limit the scope nor inhibit the broad teachings of the electrical circuits as potentially applied to a myriad of other architectures.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiment.

Numerous other changes, substitutions, variations, alterations, and modifications can be ascertained to one skilled in the art, and it is intended the present disclosure encompass all such changes, substitutions, variations, alterations, and modifications as falling within the scope of the appended claims. To assist the United States Patent and Trademark Office (USPTO) and, additionally, any readers of any patent issued on this application in interpreting the claims appended hereto, Applicant wishes to note the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way not otherwise reflected in the appended claims.

What is claimed is:

1. A method to determine a trim code for an integrated circuit (IC), comprising:
   demultiplexing a drain of a power metal-oxide-semiconductor field-effect transistor (MOSFET) from a first pin of the IC to a second pin of the IC;
   demultiplexing a source of the power MOSFET from a third external pin of the IC to a fourth external pin of the IC;
   determining a voltage difference between the second pin and the fourth pin;
   testing a resistance between the drain and the source of the power MOSFET, based at least in part on the voltage difference;
   applying a voltage between the first pin and the third pin;
   Kelvin sensing between the second pin and the fourth pin to adjust the applied voltage to maintain a voltage between the second pin and the fourth pin equal to the voltage difference multiplied by a predetermined value greater than one; and
   determining the trim code by setting a current limit threshold for the power MOSFET, based at least in part on the adjusted voltage.

2. The method of claim 1, further comprising:
   setting a code to force the power MOSFET on; and
   sinking a fraction of a specified current of the power MOSFET at the third external pin.

3. The method of claim 1, further comprising:
setting a code to force the power MOSFET off;
sweeping a trim code to change a reference current of the IC to identify the determined trim code, which allows an output of the IC to transit.

4. The method of claim 3, further comprising:
setting a code to force the power MOSFET on; and
sinking a fraction of a specified current of the power MOSFET at the third external pin, wherein the applied voltage is proportional to the resistance multiplied by the fraction of the specified current.

5. The method of claim 4, wherein the determining the voltage difference is performed while the power MOSFET is on, and the applying the voltage is performed while the power MOSFET is off.

6. The method of claim 1, further comprising:
sinking a current at the third external pin, before the determining the voltage difference.

7. The method of claim 1, further comprising:
sweeping a reference current of the IC to identify the determined trim code, which allows an output of the IC to transit.

8. An apparatus to determine a trim code for an integrated circuit (IC), comprising:
equipment configured to demultiplex a drain of a power metal-oxide-semiconductor field-effect transistor (MOSFET) from a first pin of the IC to a second pin of the IC and to demultiplex a source of the power MOSFET from a third external pin of the IC to a fourth external pin of the IC; and
a processing unit configured to determine a voltage difference between the second pin and the fourth pin, wherein the equipment is further configured to test a resistance between the drain and the source of the power MOSFET, based at least in part on the voltage difference, to apply a voltage between the first pin and the third pin, and to Kelvin sense between the second pin and the fourth pin to adjust the applied voltage to maintain a voltage between the second pin and the fourth pin equal to the voltage difference multiplied by a predetermined value greater than one, and the processing unit is further configured to determine the trim code by setting a current limit threshold for the power MOSFET, based at least in part on the adjusted voltage.

9. The apparatus of claim 8, wherein the equipment sets a code to force the power MOSFET on, and the equipment sinks a fraction of a specified current of the power MOSFET at the third external pin.

10. The apparatus of claim 8, wherein the equipment sets a code to force the power MOSFET off, and the equipment is configured to sweep a trim code to change a reference current of the IC to identify the determined trim code, which allows an output of the IC to transit.

11. The apparatus of claim 10, wherein the processing unit determines the voltage difference while the power MOSFET is on, and the equipment applies the applied voltage while the power MOSFET is off.

12. The apparatus of claim 11, wherein the equipment sets a code to force the power MOSFET on, the equipment sinks a fraction of a specified current of the power MOSFET at the third external pin, and the applied voltage is proportional to the resistance multiplied by the fraction of the specified current.

13. The apparatus of claim 8, wherein the equipment is configured to sink a current at the third external pin, before the processing unit determines the voltage difference.

14. The apparatus of claim 8, wherein the equipment sweeps a reference current of the IC to identify the determined trim code, which allows an output of the IC to transit.

15. At least one non-transitory medium that includes code for execution and, when executed by a processor, operable to perform operations for determining a trim code for an integrated circuit (IC), the operations comprising:
demultiplexing a drain of a power metal-oxide-semiconductor field-effect transistor (MOSFET) from a first pin of the IC to a second pin of the IC;
demultiplexing a source of the power MOSFET from a third external pin of the IC to a fourth external pin of the IC;
determining a voltage difference between the second pin and the fourth pin;
testing a resistance between the drain and the source of the power MOSFET, based at least in part on the voltage difference;
applying a voltage between the first pin and the third pin;
Kelvin sensing between the second pin and the fourth pin to adjust the applied voltage to maintain a voltage between the second pin and the fourth pin equal to the voltage difference multiplied by a predetermined value greater than one; and
determining the trim code by setting a current limit threshold for the power MOSFET, based at least in part on the adjusted voltage.

16. The at least one medium of claim 15, the operations further comprising:
setting a code to force the power MOSFET on; and
sinking a fraction of a specified current of the power MOSFET at the third external pin.

17. The at least one medium of claim 15, the operations further comprising:
setting a code to force the power MOSFET off;
sweeping a trim code to change a reference current of the IC to identify the determined trim code, which allows an output of the IC to transit.

18. The at least one medium of claim 17, the operations further comprising:
setting a code to force the power MOSFET on; and
sinking a fraction of a specified current of the power MOSFET at the third external pin, wherein the applied voltage is proportional to the resistance multiplied by the fraction of the specified current.

19. The at least one medium of claim 15, the operations further comprising:
sinking a current at the third external pin, before the determining the voltage difference.

20. The at least one medium of claim 15, the operations further comprising:
sweeping a reference current of the IC to identify the determined trim code, which allows an output of the IC to transit.

* * * * *